United States Patent [19]
Anderson

[11] Patent Number: 4,484,852
[45] Date of Patent: Nov. 27, 1984

[54] HOPPER BOTTOM UNIT

[75] Inventor: Arthur I. Anderson, St. Paul, Minn.

[73] Assignee: North American Car Corporation, Chicago, Ill.

[21] Appl. No.: 369,803

[22] Filed: Apr. 19, 1982

Related U.S. Application Data

[63] Continuation of Ser. No. 137,438, Apr. 3, 1980, abandoned.

[51] Int. Cl.³ .................... B60P 1/00; B65G 69/06
[52] U.S. Cl. ................... 414/525 A; 406/134; 222/199; 222/200; 298/1 V
[58] Field of Search ........... 298/1 V; 222/199, 200; 294/64 R, DIG. 2; 414/525 R, 525 A; 406/134, 137

[56] References Cited

U.S. PATENT DOCUMENTS

| 383,145 | 5/1888 | Pilliod | 222/199 |
| 1,421,896 | 7/1922 | Benedict | 222/200 |
| 1,570,795 | 1/1926 | Tainton | 222/200 |
| 2,229,037 | 1/1941 | Boldman | 414/525 A |
| 2,381,802 | 8/1945 | Booth et al. | 222/200 |
| 2,745,232 | 5/1956 | Alfandie et al. | 222/199 |
| 3,215,314 | 11/1965 | Haley | 222/199 |
| 3,435,993 | 4/1969 | Honkel | 222/200 |
| 3,747,810 | 7/1973 | Graser | 222/199 |
| 3,892,337 | 7/1975 | Neumann | 222/199 |
| 4,251,013 | 2/1981 | Krause | 222/198 |

FOREIGN PATENT DOCUMENTS

| 311419 | 4/1918 | Fed. Rep. of Germany | 222/200 |
| 1279546 | 10/1968 | Fed. Rep. of Germany | 222/200 |
| 2029046 | 12/1971 | Fed. Rep. of Germany | 222/200 |
| 6596 | of 1909 | United Kingdom | 222/199 |
| 663648 | 5/1979 | U.S.S.R. | 222/200 |

Primary Examiner—Trygve M. Blix
Assistant Examiner—R. B. Johnson
Attorney, Agent, or Firm—Lockwood, Alex, FitzGibbon & Cummings

[57] ABSTRACT

A bottom unit for a material transportation car hopper includes a planar membrane which is oriented at an angle with respect to horizontal and slopes toward a hopper discharge pipe. The bottom unit is separate from the discharge pipe. The bottom unit includes a vibrator for vibrating the membrane, and projections on the membrane for agitating the material adjacent the membrane.

6 Claims, 3 Drawing Figures

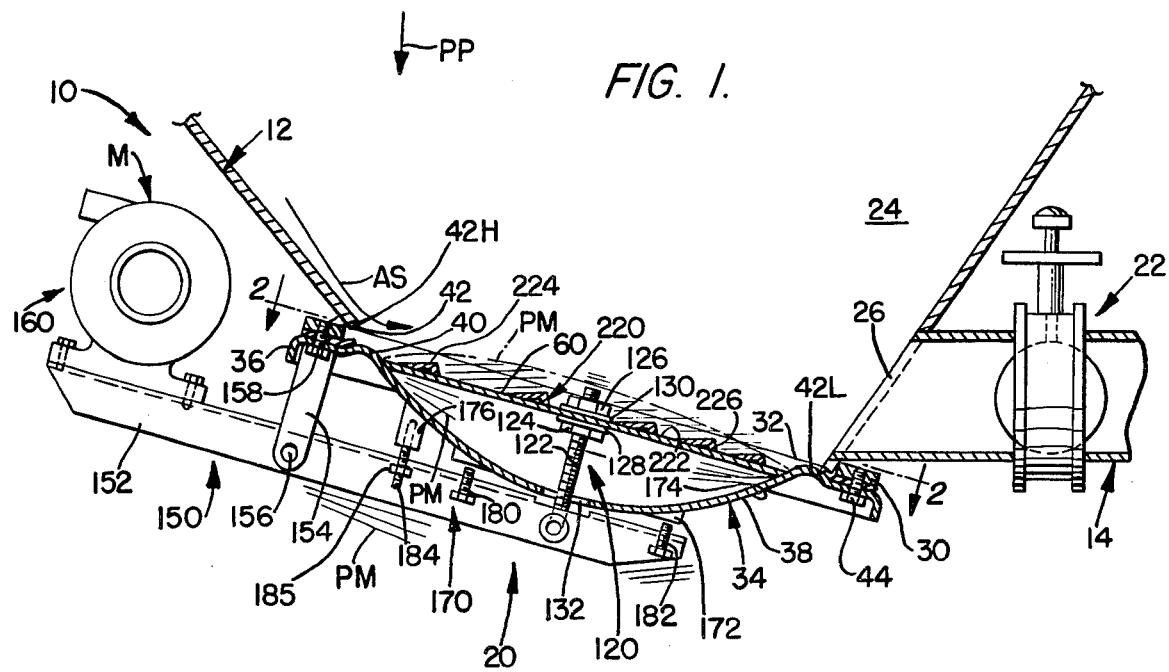
FIG. 1.
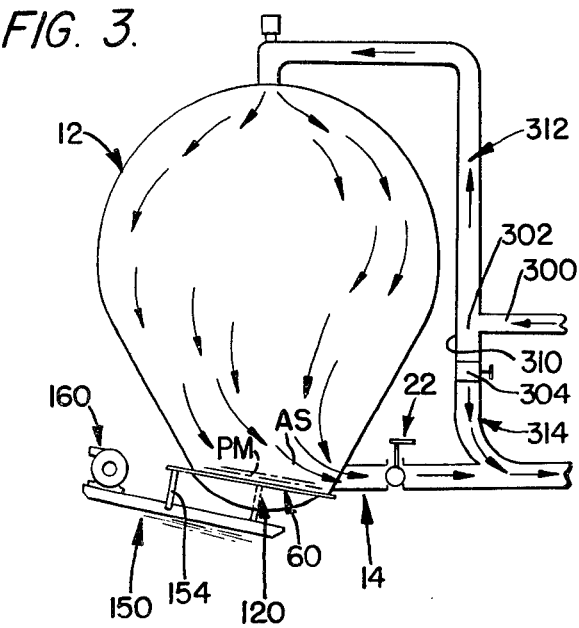
FIG. 2.
FIG. 3.

HOPPER BOTTOM UNIT

This is a continuation of application Ser. No. 137,438, filed Apr. 3, 1980 now abandoned.

BACKGROUND OF THE INVENTION

The present invention relates in general to material transport car, and, more particularly, to hopper-type cars.

Hopper cars are commonly used to transport fluent material such as dry product. Dry products include flour, cement, sugar, starch and the like. Some of these products must be highly fluidized to facilitate the unloading thereof, and U.S. Pat. No. 3,929,261 discloses a fluidization device.

Even with fluidization, some quantity of material remains in the car after the completion of a discharge process. In some cases, the quantity of this remaining material can be quite significant, for example, 1,000 pounds of residue or more is possible. This residue is most often found near the periphery of the hopper, and in the case of a side located outlet, in a location remote from that outlet. Even fluidization does not clear out such residue from prior art cars.

Accordingly, there is need for a device which will assure the nearly complete discharge of material from a hopper car and reduce the amount of residue to insignificant, and possibly zero, levels.

SUMMARY OF THE INVENTION

The device embodying the teachings of the present invention prevents build-up of material adjacent a hopper material discharge outlet, and facilitates the complete emptying of such hopper.

The device includes a bottom unit which is attached to a hopper of a material transport car, such as a railroad car, truck, or the like. The bottom unit is separate and independent of the car discharge pipe and is spaced therefrom.

The bottom unit can thus be changed without requiring a great deal of labor and time. Installation, maintenance, and the like are thus more efficient than in prior art devices which have the piping and discharge manifolds thereof connected to a bottom unit of a hopper.

The bottom unit includes a planar membrane covering the hopper bottom and oriented in a plane which is sloped at an angle with respect to horizontal toward the discharge outlet of the hopper. Thus, discharge of material is gravity assisted.

A vibration producing means is connected to the membrane to cause that membrane to vibrate rapidly during discharge of product through the hopper discharge outlet. This vibration producing means includes a motor mounted on a beam.

The unit further includes projections on the membrane which agitate the material toward the hopper outlet as the membrane vibrates. It is here noted that the term "membrane" is intended to include plates.

OBJECTS OF THE INVENTION

It is the main object of the present invention to discharge material from a hopper completely without leaving a significant residue of material.

It is another object of the present invention to prevent build-up of material adjacent a discharge outlet of a hopper.

It is yet another object of the present invention to facilitate movement of material into a hopper discharge outlet.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a side elevation of a hopper including the device embodying the teachings of the present invention.

FIG. 2 is a view taken along line 2—2 of FIG. 1.

FIG. 3 is a schematic showing air flow into and through a hopper including the device embodying the teachings of the present invention.

DETAILED DESCRIPTION OF THE INVENTION

Shown in FIG. 1 is a dispensing means 10 which is used in conjunction with material transport cars used to transport fluent material such as sugar, cement, starch, or the like, or slurries, if so desired. The car includes a hopper 12 through which the material flows for discharge. As above-discussed, those transport cars heretofore known include discharge piping as an integral portion of an aeration bottom, and accordingly, have created problems.

It is noted that co-pending application Ser. No. 144,850, filed on Apr. 29, 1980, discloses aeration bottoms having an air sweep effect. The disclosure of this application is incorporated herein by reference thereto.

As best shown in FIG. 1, the dispensing means 10 includes a discharge conduit 14 attached to the hopper adjacent the lowermost end thereof, and the car includes a bottom unit 20 which is independent of the discharge conduit. The discharge conduit includes a shutoff valve 22 which can be a manual valve such as a butterfly valve, or the like, and is in fluid communication with interior 24 of the hopper via outlet port 26 whereby fluent material contained in the car is discharged therefrom via the discharge system attached to the hopper itself at a location above the lowermost portion of the hopper entity.

The bottom unit 20 includes an annular flange 30 securely attached to the hopper circumjacent hopper opening 32. The bottom unit includes a dish-shaped casing 34 which has an integral circumambient attaching flange 36 on the circumferential edge of a body section 38. Preferably, the casing has a circular peripheral shape. An annular bulging section 40 is defined in the casing to be inwardly adjacent the flange 36 and to be inwardly adjacent lip 42 of the hopper.

Fasteners, such as bolts 44, attach the flanges 30 and 36 together and are located in aligned openings defined in such flanges.

As shown in FIG. 1, the bottom lip of the hopper is defined in a plane which is slanted with respect to the horizontal. The plane is tilted so lowest point 42L of the hopper lip is located subjacent outlet port 26, and highest point 42H of the lip is located diametrically opposite the outlet port 26. Preferably, the plane is tilted at an angle of 15° to the horizontal so that fluent material is gravity assisted as that material flows toward and through outlet port 26. The unit 20 includes a planar circular metal plate 60 spanning the hopper opening 32. The metal plate is preferably 24 inches in diameter. The metal plate is vibrated by a vibration unit, or impulser 120.

The impulser 120 includes a bolt 122 attached to planar plate 60 by paired nuts 124 and 126 with washers 128 and 130 interposed between the nuts and the plate. The bolt is received through a bolt hole 132 defined in the body section 38.

Movement of the plate 60 is produced by the impulser, which, in turn, is moved by a vibrator unit 150 which includes a beam 152 attached near one end thereof to the bolt 122 and to the flanges 30 and 36 via a brace 154, a pivot pin 156 and a fastener 158.

A primary vibration producer 160 is mounted on the beam on the end thereof remote from the bolt 122 to generate vibration which is transmitted via the beam 152 and the bolt 122 to the plate 60 to produce a pulsating movement of the plate. Such pulsating movement is indicated in FIG. 1 by the phantom lines PM.

The impulser includes adjustment means 170 for controlling the amplitude of movement of the plate and adjusting the zero, or at-rest, position of the plate with respect to the hopper opening. The adjustment means 170 includes a contact plate 172 on outer surface 174 of the body section 38, and downwardly depending tubular sleeve 176 on the body section. The tubular sleeve is internally threaded. Adjustment screws 180 and 182 are threadably mounted in the beam and abut the contact plate to set the distance between that beam and the plate. A further adjustment screw 184 passes through the beam and is threadably attached to the tubular sleeve 176 and carries a nut 185 for further adjusting the position of the beam with respect to the body section 38.

The primary vibration producer includes a motor M, however, other devices can be used if so desired.

A multiplicity of projections 220 are located on top surface 222 of the plate 60. The projections are elongate and are triangular in transverse cross-section. The projections are oriented so that each projection forms a ramp 224 which is ascending toward the discharge outlet 26 from the plate 60. The projections further include a rear leg 226 which is sloped upwardly from the plate 60 away from the discharge outlet 26. The projections are longitudinally arcuately curved as shown in FIG. 2, and the overall ganged nature of the projections forms a riffle-like pattern as best shown in FIG. 2.

Vibrating movement of the plate 60 combined with the sloping orientation thereof strongly influences material toward the discharge outlet 26. The riffle pattern of the projections prevents the material from sticking to the plate, and thus essentially all of the material contained in the hopper will be discharged therefrom without any significant residue. The dimensions and curvature of the projections are selected to produce the most effective motion which is transmitted to the product. The plate 60 deforms under influence of the vibration inducing means as indicated in FIG. 1 by the phantom lines PM. This deformation is further influenced by the fastener 120 which causes an indentation adjacent thereto. The shape, size, placement, pattern, spacing and location of the projections are defined to influence the product toward the exhaust manifold 14 as the plate undergoes the cycling indicated in FIG. 1 by the phantom lines PM. The characteristics of the projections are determined by contour mapping and mathematical analyses on a computer or the like.

Furthermore, because the projections have the ramps 224 thereof sloped upwardly toward the outlet port 26, material slides over these projections and does not become lodged against the projection. The rear leg 226 of the projections slopes downwardly toward the outlet port 26 and also does not present any material catching surface as the material will slide off this rear leg also.

The sloped, vibrating plate having the riffle patterned projections thereon therefore prevents material from becoming stuck or lodged adjacent outlet port 26, and essentially no material is left in the hopper after the hopper discharge process is completed.

It is noted that pressure is applied to the product from above as indicated by arrows PP in FIG. 1. This pressure is generally produced by air, or other such material. The air flows downwardly along the hopper wall and is funneled toward the discharge outlet 26 due to the shape of the projections and the movement of the material adjacent the vibrating plate. This air flow thus sets up a moving film which tends to sweep the plate and moves into the discharge outlet carrying material into such discharge outlet. Such air sweep effect further insures the complete emptying of the hopper during the discharge operation. The air sweep effect is indicated in FIG. 1 by the arrow AS, and is clearly shown in FIG. 3. The relative length of the projection legs inhibits air flow in the opposite direction, and accordingly, once established, the air sweep remains in the direction indicated by arrow AS in FIG. 1. Also shown in FIG. 3 is the air influx used to inject air into the hopper. Air from a supply (not shown in FIG. 3) moves through first manifold 300 into tee connection 302. A valve 304 controls air flow through air line 310. One path 312 of the line 310 leads into the hopper, and another path 314 connects with line 14 downstream of the valve 22. Using the valve 304 air can be directed either into the hopper into both the hopper and the product exhaust manifold 14.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. In a hopper for discharging fluent material, said hopper having an outlet port, an opening at the bottom of said hopper, said opening being defined by a lip located in a plane that is slanted at an angle with respect to the horizontal, the lowest point of said lip being located subjacent to said outlet port and the highest point of said lip being located across said opening opposite and spaced from said outlet port, wherein the improvement comprises a discharge unit comprising:

a casing with an integral attaching flange on a circumferential edge thereof;

means for attaching said edge of said casing to said lip circumjacent said opening such that said discharge unit is attached to said hopper independently of and spaced from said outlet port;

a planar plate mounted within said casing and tilted at said angle and sloping toward said outlet port;

a plurality of spaced elongated, longitudinally curved projections mounted on the top surface of said plate so as to define a riffle-like pattern thereon, each of said projections including a ramp ascending toward said outlet port from said plate and a rear leg that is sloped upwardly from said plate away from said outlet port such that said projections are triangular in transverse cross-section; and a vibration producer, means connecting said producer to said plate and projections to cause said plate and projections to pulsate thereby assisting the movement of fluent material in said hopper toward said outlet port.

2. The discharge unit defined in claim 1 wherein said angle is about 15°.

3. The discharge unit defined in claim 1 wherein said plate is metal.

4. The discharge unit defined in claim 1 wherein said vibration producing means includes a beam connected to said plate and a motor mounted on said beam which induces vibration in said beam to be transmitted to said plate.

5. The discharge unit defined in claim 4 further including adjustment means on said beam for controlling amplitude of movement of said beam and a zero position of said beam.

6. The combination defined in claim 1 wherein said hopper bottom is the hopper bottom of a material transport car.

* * * * *